July 4, 1950 W. A. BIERMANN 2,514,306
DRAFT REGULATOR FOR HIGH-LOW LIQUID FUEL BURNERS
Filed March 26, 1947 2 Sheets-Sheet 1

INVENTOR
WILLIAM A. BIERMANN
By: John W. Michael
ATTORNEY

July 4, 1950 W. A. BIERMANN 2,514,306
DRAFT REGULATOR FOR HIGH-LOW LIQUID FUEL BURNERS
Filed March 26, 1947 2 Sheets-Sheet 2
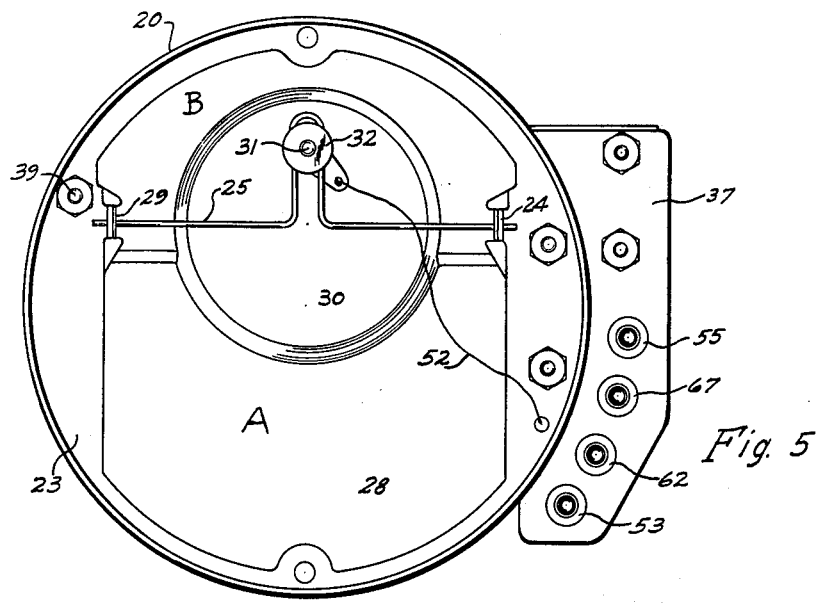
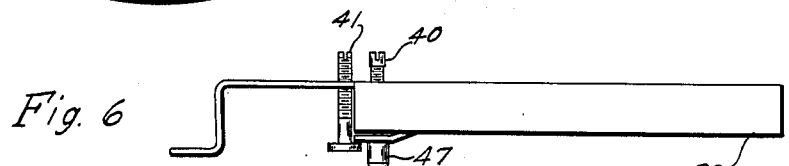
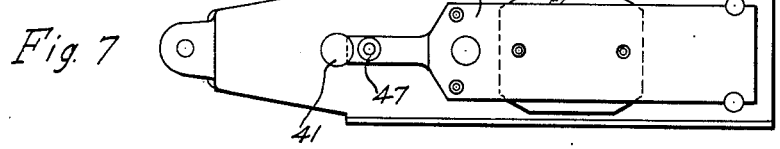
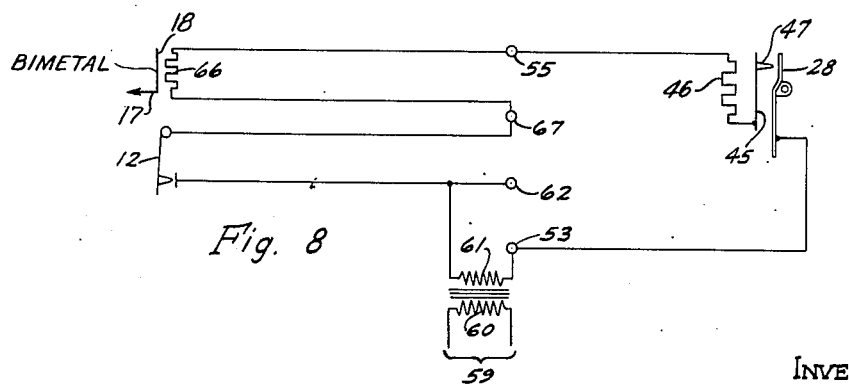
INVENTOR
WILLIAM A. BIERMANN
By John W. Michael
ATTORNEY Patented July 4, 1950

2,514,306

UNITED STATES PATENT OFFICE 2,514,306

DRAFT REGULATOR FOR HIGH-LOW LIQUID FUEL BURNERS

William A. Biermann, Milwaukee, Wis., assignor to Automatic Products Company, Milwaukee, Wis., a corporation of Wisconsin Application March 26, 1947, Serial No. 737,301

3 Claims. (Cl. 158—28)

This invention relates to improvements in means for regulating the supply of air for combustion in a furnace or stove and particularly to a system in which an air regulator is co-related with the fuel supply control means.

In liquid fuel burning furnaces or stoves in which the fuel supply is thermostatically controlled, it is desirable that the combustion air supply also be thermostatically controlled to maintain substantially a constant air-fuel ratio for satisfactory combustion. When the major portion of the air is supplied by a motor-driven fan, it is desirable that means be provided which will maintain substantially the desired air-fuel ratio even though the fan motor fails and such means should then particularly be related to the fuel flow control.

It is therefore one object of the present invention to provide means acting responsive to the operation of a fuel flow control device to a furnace or stove and effective for automatically maintaining the combustion air supply to the burner.

Another object of the invention is to provide a combustion air flow regulating device responsive in part to the supply of fuel to the burner and in part to the operation or non-operation of means normally supplying the major portion of the combustion air.

A further object of the invention is to provide a regulating system in which a regulator in the inlet of a power-driven fan supplying air under pressure to a fuel burner is automatically adjusted to different positions dependent on the flow of fuel and on the operation or non-operation of the fan.

Another object of the invention is to provide a system for regulating the supply of combustion air to a fuel burner in response jointly to the energization of an electrically controlled fuel flow valve, to the pressure of air flowing to the burner under the action of a fan and to an adjustable weight acting on the gate.

And a further object of the invention is to provide a regulating system in which the gate of the regulator also functions as a switch in a circuit controlling both the flow of fuel and the positioning of the gate.

Objects and advantages other than those above set forth will be apparent from the following description when read in connection with the accompanying drawings, in which:

Fig. 5 is an elevation of the other side of the regulator;

Fig. 6 is a top plan view of one sub-assembly of the structure;

Fig. 7 is a bottom plan view of a portion of the structure shown in Fig. 6, and

Fig. 8 is a diagram of the electrical circuit included in the present system and controlling the thermo-element of the present device.

Figure 2:
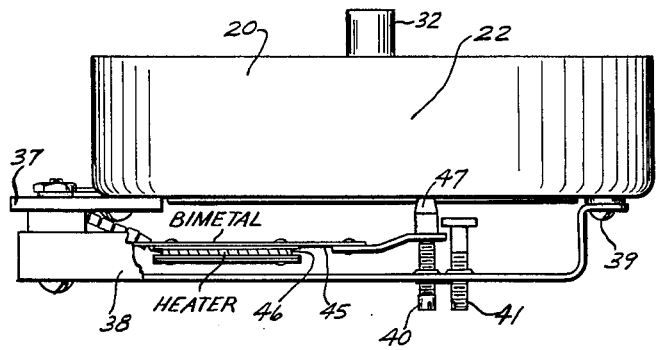
Fig. 2 is a top view of a regulator embodying the present invention.
Figure 3:
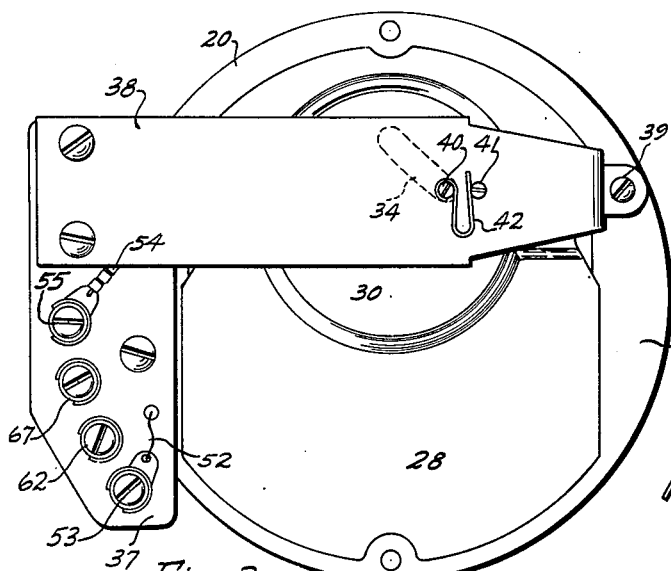
Fig. 3 is an elevation of one side of the regulator.

Generally, the present system includes a gate mounted in the inlet of a continuously operated power driven fan by which combustion air is normally supplied under pressure to a burner for fuel of which the flow is thermostatically controlled. The gate is so mounted and is biased by a weight as to assume a minimum open position so long as the air is supplied by the fan under pressure. The weight causes the gate to assume a maximum open position when the fan ceases operation and the gate assumes an intermediate position upon energization of a thermal element responsive to operation of the fuel control device. The minimum gate opening allows sufficient air to enter for a low fire when the fan operates, the intermediate opening increases the air flow at high fire with fan operation and the maximum opening allows sufficient air flow, under natural draft, for temporary high fire during consumption of residual fuel, even when the fan fails. Both the gate thermal element and the fuel flow control device include electrically energized heaters connected in series circuit so that the failure of any one heater interrupts the circuit to the other heater.

Referring particularly to the drawing, 10 designates the casing of a liquid fuel burning including a burner of the pot type to which fuel is to be constantly supplied in varying quantities and where the fuel is constantly ignited for burning with either a low or pilot flame or a high or full flame depending on the action of a thermostat located in the space to be heated, the thermostat being of any well known type such as described in Patent No. 2,225,080 to Newman on December 17, 1940, and only indicated diagrammatically at 12 in Fig. 8. Fuel is supplied to the burner from a raised tank (not shown) under the control of a known device of the constant level type indicated at 13 and fully disclosed in Patent No. 2,351,973 to Johnson et al. on June 20, 1944. Such device includes a bimetal 18 on which is mounted a heater 66 for electric energization under the control of the thermostat and otherwise controlled to regulate valve 17. A conduit 14 connects the furnace casing with a power driven (preferably electric motor driven) fan 15 which is intended to operate continuously and maintain a constant flow of air through the conduit to the burner regardless of the amount of fuel consumed. A regulator indicated at 16 is mounted in the fan inlet to provide means for adapting flow of air into the conduit to the quantity required by the burner whether or not the fan is in operation.

The regulator 16 includes a member 20 which serves as a partial housing for and a support for other portions of the regulator structure. Such housing is generally shaped as a shallow pan with a wall 22 and a bottom 23 in which is formed an opening with straight sides and arcuate ends and with lugs 24 extending from the sides of the opening into the space within the housing wall. The bottom is provided with suitable holes for mounting the regulator as a whole in the inlet of the fan housing.

A flap or gate 28 which is peripherally shaped to conform to the opening in the bottom of the housing and support, has lugs 29 extending from the sides to match the housing lugs 24 when the gate is positioned in the housing opening, the several lugs being apertured to receive a wire 25 serving as a pivot for the gate. The gate is made of relatively light sheet metal and has formed therein a cavity which places a wall portion 30 thereof out of the plane of the remainder of the gate. A screw-threaded stud 31 is fixed in the gate wall portion 30 adjacent that end of the gate which is uppermost and on the side of the gate facing into the fan housing when the regulator is in use. The stud receives a nut 32 of relatively large size which serves as a weight to bias or tilt the gate diagonally in the housing opening so that air may flow about the gate edges into the fan housing. The housing lugs 24 and the gate lugs 29 are above the central horizontal axis of the housing opening and of the gate so that approximately two-thirds of the area of the gate surface is below the pivot axis to provide an area A as opposed to the much smaller area B above the pivot axis. Pressure of air flowing into the fan housing upon operation of the fan, and about the gate edges, acts on the several gate areas and co-acts with the weight 32 in holding the gate in a minimum open position, the pressure on area A opposing the pressure on area B and the force of weight 32 tending to open the gate. A plate 34 of good electrical conductive material is fixed on the gate to provide one contact of a switch in a circuit to be hereinafter described.

A panel 37 of electrical insulating and heat resistive material is mounted on the housing 20 and extends along one side of the opening therethrough to receive a bracket 38, a heat motor and various electric terminals as will be described. The bracket 38 extends over the opening in the housing 20 and has one end fixed directly to such housing as by a bolt 39. The bracket extends in spaced relation to the gate 28 and substantially above the pivoting axis thereof and is partially flanged to provide a structure of material rigidity. Screws 40 and 41 extend through the bracket, screw 41 being provided with a flanged head for a purpose to be described, and both screws are held in adjusted position by a bar spring 42 engageable with the threads of both screws.

The heat motor includes a bimetallic strip 45 fixed at one end on the terminal panel 37 and extending adjacent to the bracket 38 and between the end of screw 40 and the head of screw 41, the bimetal warping when cold to bring the free end thereof into contact with the screw 40. The two screws 40 and 41 thus act as stops to limit, respectively, the positions of the bimetal when hot and when cold. The bimetal bears a heater 46 which comprises a resistance wire mounted between electrical insulating and heat resistive material such as sheets of mica. Such heaters are well known and are not particularly described herein. The movable end of the bimetal bears an electric contact 47 which may engage with contact plate 34 on the gate.

The gate 28 is connected by an electrical conductor 52 with terminal 53 on the panel 37. The contact 47 is connected with one end of the resistor of heater 46 while the other end of such resistor is connected by a flexibly sheathed electrical conductor 54 with a terminal 55 on the terminal panel.

Referring now to the electrical circuit diagram in Fig. 8, the usual residential electrical supply line is indicated at 59 and is connected with the primary winding 60 of a transformer having its secondary winding 61 connected with the terminal 53 and with a terminal 62. Numeral 66 designates the heater for bimetal 18 carrying fuel valve 17 (and corresponds to element 81 of Patent 2,351,973). Such heater is connected between the terminal 55 and a terminal 67 on the panel 37. The thermostatically actuated switch 12 is connected with terminals 62 and 67 and is mounted in the space to be heated by the furnace or stove, as is usual.

The operation of the system will now be described, assuming that thermostat 12 is open because there is now no demand for heat, that a fuel control device 13 supplies sufficient fuel only to obtain a low pilot fire in the burner and that fan 15 is operating. Operation of the fan produces such pressure on gate area A as overbalances the pressure on area B and the effect of weight 32, thereby closing the gate 28 to minimum opening for the passage therethrough of air for low fire only. In such gate position, the gate switch 34, 47 is closed but the thermostat 12 is still open and there is therefore no electrical circuit to heaters 46 and 66. Fuel flow is accordingly kept at the pilot or low fire quantity and the bimetal 45 remains against its limit stop 40 and does not act on the gate.

Assuming now that more heat is required, the thermostat 12 closes and completes a circuit to heaters 46 and 66 which warp their several bimetals so that bimetal 45 is moved against the maximum limit stop 41 and the outlet valve 17 of control device 13 is opened to permit fuel flow sufficient to maintain a high fire. Bimetal 45 now presses on area B of the gate and aids weight 32 in overbalancing the differential pressure on gate 28 to open the gate wider than during the pilot fire condition first described. During such wider or intermediate open position of the gate, movement of the bimetal 45 has kept the gate switch 34, 47 closed.

If the demand for heat is satisfied, the thermostat 12 reopens which breaks the circuit of heaters 46 and 66, hence bimetal 45 cools and returns to rest on stop 40 while the outlet valve 17 of the fuel control device 13 returns to the position for supplying only the quantity of fuel required to maintain a pilot fire.

Figure 4:
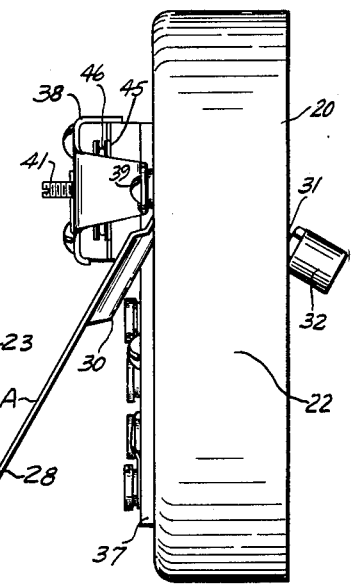
Fig. 4 is a side edge elevation of the structure shown in Fig. 3.
Figure 1:
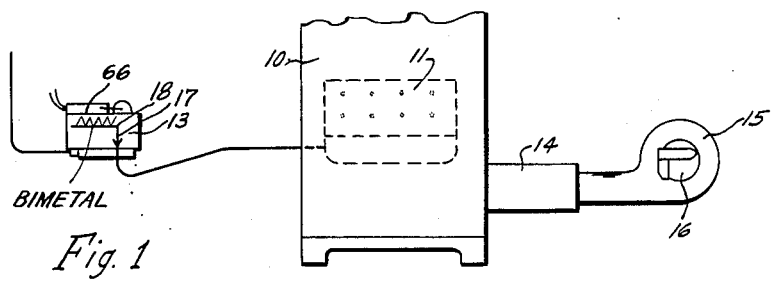
Fig. 1 is a diagram showing the mechanical relation of parts of a heating system including the present invention.

The above three steps constitute the cycle of the operation of the system so long as all of the parts are in full operating condition. Assuming now that the fan fails to operate for any reason, there is then no longer any pressure on gate area A which is overbalanced by gate area B plus weight 32 to swing the gate to its maximum open position shown in Fig. 4. Such gate opening separates switch contacts 34 and 47. Hence if the thermostat 12 has been closed and the fuel control device 13 has been supplying fuel for a high fire, the circuit to heaters 46 and 66 is now opened and fuel flow is again restricted to the quantity required for low fire only. Such fire, however, requires a material quantity of air which is now drawn through the maximum open gate 28 by the natural draft produced by the fire, the several adjustments of the gate having been previously so made that the gate opening is adjusted to the particular furnace to maintain the proper fuel-air ratio for such furnace. If fan failure has been due only to current interruption, re-establishment of the current allows the fan to re-start and such re-starting will return the gate to the minimum open position first described, thereby closing switch 34, 47 and the system is again ready to go through the normal cycle. If the fan has failed by reason of motor failure or any reason other than current failure only, re-closing of switch 34, 47 does not occur and the system is automatically maintained in the low fire condition until the fan has been repaired.

It will thus be seen that the gate is drawn, by air pressure, into a minimum open position when the fan is operating to supply air for low fire, is opened to an intermediate position responsive to operation of the fuel flow control device when such device supplies fuel for a high fire and is returned to the minimum open position when fuel flow is again reduced to the low fire quantity. When the fan fails for any reason whatever, the weight 32 opens the gate to the maximum position thus automatically preventing fuel flow above the low fire quantity and providing a gate opening through which sufficient air is drawn into the burner by natural draft for the low fire. It is accordingly impossible for any condition to occur at which enough air is not supplied to secure proper combustion of the fuel.

Although but one embodiment of the present invention has been illustrated and described it will be apparent to those skilled in the art that various changes and modifications may be made therein without departing from the spirit of the invention or from the scope of the appended claims.

I claim:

1. A fail safe automatic air-flow regulator, comprising, a housing having an opening therethrough adapted to cooperate with an air-flow conduit communicating with a burner, a gate eccentrically pivoted in the housing opening so that air-flow tends to close the gate, a weight mounted on the gate and urging the gate towards its maximum open position at natural draft conditions, a bridging member extending across the housing opening, a bimetal mounted on the bridging member and engaging the gate eccentrically of its pivot axis, means for heating the bimetal, the bimetal urging the gate towards its open position when heated, and stops mounted on the bridging member for limiting the warping movement of the bimetal between a position for minimum gate opening and a position intermediate the minimum and maximum gate openings, movement of the gate to the maximum position from the intermediate position interrupting engagement of the bimetal and the gate.

2. A fail safe automatic air-flow regulator, comprising, a housing having an opening therethrough, the opening adapted to communicate with an air supply duct on the intake side of a blower delivering air to a burner, a gate pivotally mounted eccentrically in the opening to present unequal gate areas to the air-flow, a weight mounted on the gate tending to maintain the gate at its maximum open position, the air-flow pressure on the unequal areas being sufficient to move the gate to its minimum opening under forced circulation conditions but insufficient to move the gate from its maximum position under natural draft conditions, a bridging member extending across the opening and spaced from the gate in all gate positions, a bimetal mounted on the bridging member and engaging the gate eccentrically of its pivot axis, means for heating the bimetal, the bimetal urging the gate towards its open position when heated, stops mounted on the bridging member for limiting bimetal movement between a position for minimum gate opening and a position intermediate the minimum and maximum gate openings, said bimetal and said gate including circuit elements, and an electric circuit including a thermostat and said elements, said thermostat being operative to control the gate position by controlling the heating of the bimetal when the elements are maintained in contact by the air pressure on the gate and inoperative to control the gate position when the forced circulation fails and the weight moves the gate to its maximum open position, breaking the contact between the elements.

3. A control system for maintaining a substantially constant air-fuel ratio, comprising in combination, a burner, continuously operated fan means delivering air to the burner, a housing on the intake side of the fan means, a gate eccentrically pivoted in an opening in the housing for controlling air-flow to the burner, a weight mounted on the gate and biasing the gate to a maximum open position in opposition to the unequal pressures exerted on the eccentrically pivoted gate by natural draft conditions, said fan means creating a pressure differential on the gate of sufficient magnitude to close the gate to a minimum open position in opposition to the action of the weight, a source of fuel, a fuel control device which passes fuel for low heat conditions at all times and having a valve movable to pass additional fuel for high heat conditions, a first bimetal connected to the valve, a member mounted on the housing and bridging the opening, a stop on the member, a thermostat, a first heater for warping the first bimetal and connected in circuit with the thermostat to move the valve to pass additional fuel when the thermostat calls for heat, a second bimetal mounted on the bridging member, a second heater for warping the second bimetal, the second bimetal engaging the gate and moving the gate from its minimum position to an intermediate open position determined by the second bimetal warping into contact with the stop when the thermostat calls for heat, failure of the fan means allowing the gate to pivot to its maximum position for natural draft and simultaneously breaking the circuit including the first bimetal to move the valve to the low heat fuel flow condition.

WILLIAM A. BIERMANN.

REFERENCES CITED

The following references are of record in the file of this patent:

UNITED STATES PATENTS

| Number | Name | Date |
|---|---|---|
| 2,255,917 | Donley et al. | Sept. 16, 1941 |
| 2,237,041 | Schreuder | Apr. 1, 1941 |
| 2,329,473 | Landon | Sept. 14, 1943 |